US010205813B2

(12) United States Patent
Zhao

(10) Patent No.: US 10,205,813 B2
(45) Date of Patent: Feb. 12, 2019

(54) METHOD AND SYSTEM FOR DETECTING ABNORMAL CONTACT INFORMATION AND SERVER

(71) Applicant: TENCENT TECHNOLOGY (SHENZHEN) COMPANY LIMITED, Shenzhen (CN)

(72) Inventor: Yan Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/728,999

(22) Filed: Oct. 10, 2017

(65) Prior Publication Data

US 2018/0034949 A1 Feb. 1, 2018

Related U.S. Application Data

(63) Continuation of application No. PCT/CN2016/082235, filed on May 16, 2016.

(30) Foreign Application Priority Data

Jul. 17, 2015 (CN) .......................... 2015 1 0425312

(51) Int. Cl.
*H04M 1/274* (2006.01)
*H04M 3/493* (2006.01)
(Continued)

(52) U.S. Cl.
CPC ..... *H04M 1/274533* (2013.01); *H04M 1/274* (2013.01); *H04M 1/274516* (2013.01);
(Continued)

(58) Field of Classification Search
CPC ........ H04M 3/436; H04M 3/54; H04M 3/546; H04M 3/42059; H04M 3/527;
(Continued)

(56) References Cited

U.S. PATENT DOCUMENTS 8,199,743 B1 * 6/2012 Sylvain ............... H04M 7/0069 370/352
2005/0041787 A1 * 2/2005 Casey .................. H04M 3/436 379/88.18

(Continued)

FOREIGN PATENT DOCUMENTS

CN 101184264 A * 11/2007
CN 101184264 5/2008

(Continued)

OTHER PUBLICATIONS

International Search Report dated Aug. 17, 2016 in PCT/CN2016/082235 filed May 16, 2016, (With English Translation).

*Primary Examiner* — Nizar N Sivji
(74) *Attorney, Agent, or Firm* — Oblon, McClelland, Maier & Neustadt, L.L.P.

(57) ABSTRACT

Aspects of the disclosure provide an apparatus that includes interface circuitry and processing circuit. The interface circuitry is configured to receive contact information provided by a terminal device for a contact entry in the terminal device. The contact information includes at least one communication attribute parameter for representing an attribute of the contact entry for communication, and the communication attribute parameter includes one or more parameter characteristics. The processing circuitry is configured to determine whether the contact information of the contact entry is abnormal with one or more abnormal parameter characteristics, generate, when the contact information of the contact entry is determined to be abnormal, a new filtering rule for filtering contact entries according to the one or more abnormal parameter characteristics, and add the filtering rule to a rule base to obtain an updated rule base.

20 Claims, 9 Drawing Sheets

Obtain contact information provided by a terminal, where the contact information includes at least one communication attribute parameter, and a parameter characteristic of the communication attribute parameter is used for representing an attribute of a contact in communication — 201

Determine whether a preset communication attribute parameter in the contact information is an abnormal attribute parameter — 202

Generate, if the preset communication attribute parameter in the contact information is an abnormal attribute parameter, a target filtering rule indicating a parameter characteristic of the abnormal attribute parameter, according to the abnormal attribute parameter — 203

Add the target filtering rule to a rule base to obtain an updated rule base — 204

Send the updated rule base to the terminal, so that the terminal detects abnormal contact information according to a filtering rule in the updated rule base — 205

(51) Int. Cl.
*H04M 1/725* (2006.01)
*H04M 1/2745* (2006.01)
*H04M 3/42* (2006.01)

(52) U.S. Cl.
CPC ....... *H04M 1/725* (2013.01); *H04M 3/42136* (2013.01); *H04M 3/493* (2013.01); *H04M 2203/554* (2013.01)

(58) Field of Classification Search
CPC .. H04M 2207/20; H04M 1/274; H04M 1/725; H04M 3/493; H04W 4/16; H04W 76/04; H04W 92/02; H04W 92/10; H04L 2012/6443; H04L 2012/6481; H04Q 1/028
See application file for complete search history.

(56) References Cited

U.S. PATENT DOCUMENTS

| | | | | |
|---|---|---|---|---|
| 2009/0103701 | A1* | 4/2009 | Garg | H04M 3/436 379/142.04 |
| 2011/0069702 | A1* | 3/2011 | Oktay | H04L 65/1046 370/352 |
| 2011/0244838 | A1 | 10/2011 | Chang | |
| 2014/0016646 | A1* | 1/2014 | Gallant | H04L 12/5601 370/395.1 |
| 2017/0126876 | A1* | 5/2017 | Jassan | H04M 1/663 |

FOREIGN PATENT DOCUMENTS

| | | |
|---|---|---|
| CN | 101986672 | 3/2011 |
| CN | 103067610 | 4/2013 |

* cited by examiner

14:28
Details
Xiao Hong
Mobile
18200012366
Mobile-Zhengzhou, Henan, China Mobile
Send a message
Email address
18200012366@qq.com

FIG. 3-2

METHOD AND SYSTEM FOR DETECTING ABNORMAL CONTACT INFORMATION AND SERVER

RELATED APPLICATION

This application is at continuation of International Application No. PCT/CN2016/082235, filed on May 16, 2016, which claims priority to Chinese Patent Application No. 201510425312.1, filed with the Chinese Patent Office on Jul. 17, 2015 and entitled "METHOD FOR DETECTING ABNORMAL CONTACT INFORMATION, APPARATUS, AND SYSTEM". The entire disclosures of the prior applications are hereby incorporated by reference herein in their entirety.

FIELD OF THE TECHNOLOGY

Embodiments of the present disclosure relate to the field of communications technologies, and in particular, to a method and system for detecting abnormal contact information and a server.

BACKGROUND OF THE DISCLOSURE

With development of communications technologies, communication between people becomes increasingly convenient. A contact list used for storing contact information is provided on many terminals. When a user needs to communicate with a contact or perform another operation on a contact, the user needs to find corresponding contact information in the contact list, and then performs a corresponding operation. In actual application, some contact information, that is, abnormal contact information, is often added to the contact list against the will of the user. The abnormal contact information is, for example, contact information that is added to the contact list by a third-party application installed on a terminal.

In a related technology, whether contact information is abnormal contact information is generally detected according to various rules preset in a rule base. A specific process includes: A terminal obtains, from a server, a rule base pre-established by the server. When new contact information is generated, the terminal analyzes a name, a telephone number, and the like in the contact information to detect whether the contact information matches information indicated by a rule in the rule base. If the contact information matches the information indicated by the rule in the rule base, it indicates that the contact information is abnormal contact information. For example, in a rule in the rule base, when a name of contact information is empty and a label of a telephone number of the contact information carries a special character such as "*", it indicates that the contact information is abnormal contact information. The server regularly updates the rule base, and a rule is usually manually added or deleted according to experience.

During implementation of the embodiments of the present disclosure, the inventor finds that the foregoing technology has at least the following problem:

In the related technology, the rule base is established by the server according to a preset rule. Each time when the rule base is updated, a rule is manually added to or deleted from the rule base. A quantity of rules in the rule base is relatively small, and the rules are relatively monotonous. Therefore, the accuracy and efficiency of detecting abnormal contact information are relatively low.

SUMMARY

To resolve the problem in the related technology, embodiments of the present disclosure provide a method and system for detecting abnormal contact information and a server.

Aspects of the disclosure provide an apparatus that includes interface circuitry and processing circuitry. The interface circuitry is configured to receive contact information provided by a terminal device for a contact entry in the terminal device. The contact information includes at least one communication attribute parameter for representing an attribute of the contact entry for communication, and the communication attribute parameter includes one or more parameter characteristics. The processing circuitry is configured to determine whether the contact information of the contact entry is abnormal with one or more abnormal parameter characteristics, generate, when the contact information of the contact entry is determined to be abnormal, a new filtering rule for filtering contact entries according to the one or more abnormal parameter characteristics, add the filtering rule to a rule base to obtain an updated rule base, and send the updated rule base to the terminal device via the interface circuitry for the terminal device to filter contact entries in the terminal device according to the updated rule base.

According to an aspect of the disclosure, the contact information includes a first communication attribute parameter of contact identifier and a second communication attribute parameter of communication number, the first communication attribute parameter and the second communication attribute parameter each have a content characteristic and a label characteristic.

In an embodiment, the processing circuitry is configured to detect whether the content characteristic of the first communication attribute parameter is empty, when the content characteristic of the first communication attribute parameter is detected to be empty, detect whether the label characteristic of the second communication attribute parameter satisfies a preset label characteristic, and when the label characteristic of the second communication attribute parameter fails to satisfy the preset label characteristic, determine that the contact information of the contact entry is abnormal.

In another embodiment, the processing circuitry is configured to detect whether the content characteristic of the first communication attribute parameter is empty, when the content characteristic of the first communication attribute parameter is determined to be empty, obtain contact information of a list of contact entries from the terminal device via the interface circuitry, count a number of specific contact entries in which the content characteristic of the first communication attribute parameter is empty and when the number is greater than a preset threshold, determine that the contact information of the contact entry is abnormal.

In another embodiment, the processing circuitry is configured to detect whether the content characteristic of the first communication attribute parameter satisfies a preset content characteristic, when the content characteristic of the first communication attribute parameter fails to satisfy the preset content characteristic, detect whether the label characteristic of the first communication attribute parameter satisfies a preset label characteristic and when the label characteristic of the first communication attribute parameter fails to satisfy the preset label characteristic determine that the contact information of the contact entry is abnormal.

In another embodiment, the processing circuitry is configured to detect whether the content characteristic of the first communication attribute parameter satisfies a preset content characteristic, when the content characteristic of the first communication attribute parameter fails to satisfy the preset content characteristic, obtain contact information of a list of contact entries from the terminal device via the interface circuitry, count a number of specific contact entries in which the content characteristic of the first communication attribute parameter fails to satisfy the preset content characteristic, and when the number is greater than a preset threshold, determine that the contact information of the contact entry is abnormal.

In another embodiment, the processing circuits is configured to determine, when the contact information of the contact entry is determined to be abnormal, whether the rule base includes an existing filtering rule for filtering contact entries according to the one or more abnormal parameter characteristics, and generate, when the rule base fails to include the existing filtering rule for filtering contact entries according to the one or more abnormal parameter characteristics, the new filtering rule for filtering contact entries according to the one or more abnormal parameter characteristics.

In another embodiment, the interface circuitry is configured to receive a rule deletion message sent by the terminal device, the rule deletion message indicating a specific filtering rule without being used by the terminal device within a preset duration, and the processing circuitry is configured to delete the specific filtering rule from the rule base according to the rule deletion message.

In an example, the contact information comprises a first communication attribute parameter of contact name and a second communication attribute parameter of telephone number.

Aspects of the disclosure provide a method. The method includes receiving, by circuitry of an information processing apparatus, contact information provided by a terminal device for a contact entry in the terminal device, the contact information comprising at least one communication attribute parameter for representing an attribute of the contact entry for communication, and the communication attribute parameter having one or more parameter characteristics, determining whether the contact information of the contact entry is abnormal with one or more abnormal parameter characteristics, generating, when the contact information of the contact entry is determined to be abnormal, a new filtering rule for filtering contact entries according to the one or more abnormal parameter characteristics, adding the filtering rule to a rule base to obtain an updated rule base, and sending the updated rule base to the terminal device for the terminal device to filter contact entries in the terminal device according to the updated rule base.

Aspects of the disclosure provide a non-transitory computer-readable medium storing instructions which when executed by a computer causes the computer to perform a method for data processing. The method includes receiving contact information provided by a terminal device for a contact entry in the terminal device, the contact information comprising at least one communication attribute parameter for representing an attribute of the contact entry for communication, and the communication attribute parameter having one or more parameter characteristics, determining whether the contact information of the contact entry is abnormal with one or more abnormal parameter characteristics, generating, when the contact information of the contact entry is determined to be abnormal, a new filtering rule for filtering contact entries according to the one or more abnormal parameter characteristics, adding the filtering rule to a rule base to obtain an updated rule base, and sending the updated rule base to the terminal device for the terminal device to filter contact entries in the terminal device according to the updated rule base.

BRIEF DESCRIPTION OF THE DRAWINGS

To describe the technical solutions in embodiments of the present disclosure more clearly, the accompanying drawings required for describing the embodiments are briefly described below. The accompanying drawings in the following description show merely some embodiments of the present disclosure, and a person of ordinary skill in the art may still derive other accompanying drawings from these accompanying drawings.

FIG. 3-1 is a method flowchart of another method for detecting abnormal contact information according to an embodiment of the present disclosure;

FIG. 3-2 is a schematic diagram of a display interface of normal contact information according to an embodiment of the present disclosure;

FIG. 7-1 is a schematic structural diagram of an apparatus for detecting abnormal contact information according to an embodiment of the present disclosure;

FIG. 7-2 is a schematic structural diagram of another apparatus for detecting abnormal contact information according to an embodiment of the present disclosure.

DESCRIPTION OF EMBODIMENTS

To make the objectives, technical solutions, and advantages of the present disclosure clearer, the following further describes the present disclosure in detail with reference to the accompanying drawings. The described embodiments are merely some but not all of the embodiments of the present disclosure. All other embodiments obtained by a person of ordinary skill in the art based on the embodiments of the present disclosure shall fall within the protection scope of the present disclosure.

Figure 1:
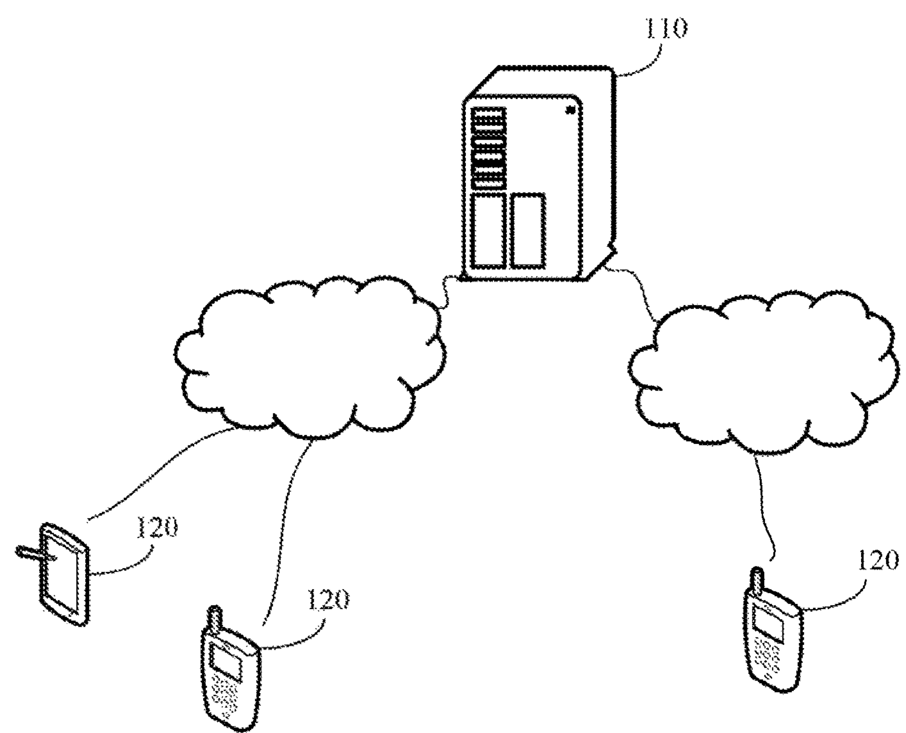
FIG. 1 is a schematic diagram of an implementation environment involved in a method for detecting abnormal contact information according to an embodiment of the present disclosure.

Referring to FIG. 1, FIG. 1 is a schematic diagram of an implementation environment involved in an embodiment of the present disclosure. The implementation environment may include a server 110 and a terminal 120.

The server 110 may be one server, a server cluster that is formed by several servers, or a cloud computing center.

The terminal 120 may be any apparatus that has a network connection function and multiple application functions and includes a contact list of contact information, and is, for example, a smartphone or a tablet computer.

The server 110 may determine, according to contact information provided by the terminal 120, whether a preset communication attribute parameter in the contact information is an abnormal attribute parameter, generate, if the preset communication attribute parameter in the contact information is an abnormal attribute parameter, a target filtering rule indicating a parameter characteristic of the abnormal attribute parameter, according to the abnormal attribute parameter, and then add the target filtering rule to a rule base to obtain an updated rule base. The terminal 120 detects the contact information in a local contact list according to a filtering rule in the updated rule base.

Figure 2:
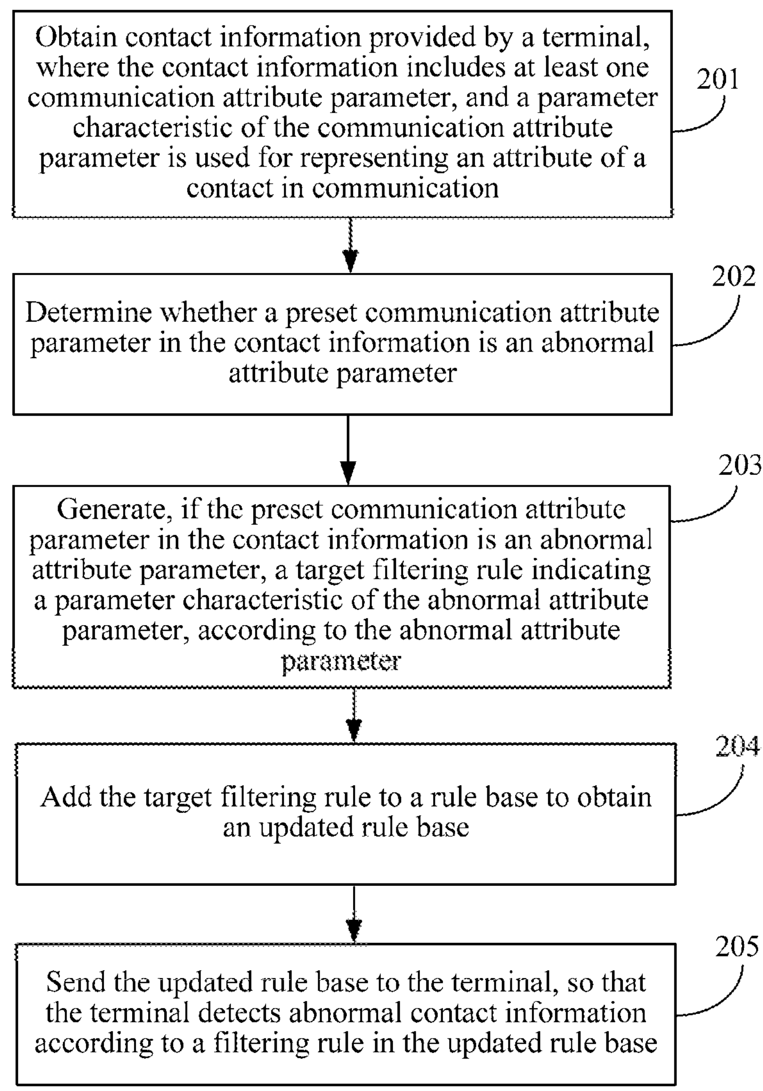
FIG. 2 is a method flowchart of a method for detecting abnormal contact information according to an embodiment of the present disclosure.

Referring to FIG. 2, FIG. 2 is a method flowchart of a method for detecting abnormal contact information according to an embodiment of the present disclosure. In this embodiment, a description is given by using an example in which the method is applied to the server 110 in the implementation environment shown in FIG. 1. The method includes:

Step 201: Obtain contact information provided by a terminal, where the contact information includes at least one communication attribute parameter, and a parameter characteristic of the communication attribute parameter is used for representing an attribute of a contact in communication.

Step 202: Determine whether a preset communication attribute parameter in the contact information is an abnormal attribute parameter.

Step 203: Generate, if the preset communication attribute parameter in the contact information is an abnormal attribute parameter, a target filtering rule indicating a parameter characteristic of the abnormal attribute parameter, according to the abnormal attribute parameter.

Step 204: Add the target filtering rule to a rule base to obtain an updated rule base.

Step 205: Send the updated rule base to the terminal, so that the terminal detects abnormal contact information according to a filtering rule in the updated rule base.

In conclusion, according to the method for detecting abnormal contact information provided in this embodiment of the present disclosure, a server can obtain contact information provided by a terminal, determine whether a preset communication attribute parameter in the contact information is an abnormal attribute parameter, and generate, when the preset communication attribute parameter in the contact information is an abnormal attribute parameter, a target filtering rule indicating a parameter characteristic of the abnormal attribute parameter, according to the abnormal attribute parameter, and add the target filtering rule to a rule base to obtain an updated rule base, so that the terminal detects abnormal contact information according to the updated rule base. Compared with a related technology for detecting abnormal contact information, a rule does not need to be manually added to a rule base, a quantity of rules in the rule base is increased, and rules become varied. Therefore, the accuracy and efficiency of detection are improved.

Figures 1, 3:
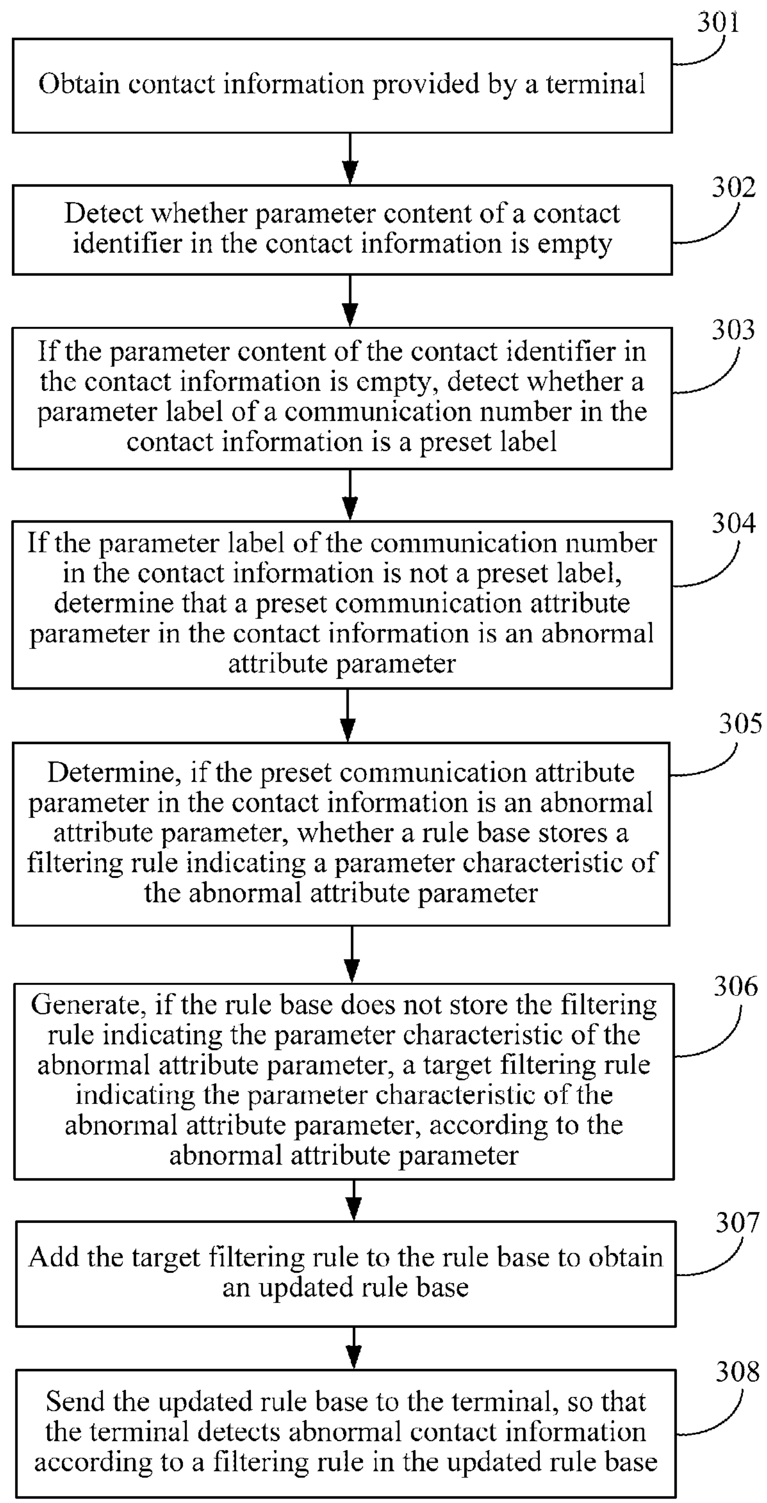

Referring to FIG. 3-1, FIG. 3-1 is a method flowchart of another method for detecting abnormal contact information according to an embodiment of the present disclosure. In this embodiment, a description is given by using an example in which the method is applied to the server 110 in the implementation environment shown in FIG. 1. The method may include:

Step 301: Obtain contact information provided by a terminal.

The contact information includes at least one communication attribute parameter. A parameter characteristic of the communication attribute parameter is used for representing an attribute of a contact in communication, for example, a contact name, a telephone number, or an email address. For example, the parameter characteristic may include parameter content and a parameter label. The parameter content is content filled in the communication attribute parameter. For example, if the communication attribute parameter is a contact identifier, and the contact identifier is "Xiao Bai" in contact information, parameter content of the contact identifier is "Xiao Bai". The parameter label is used for identifying the communication attribute parameter. The parameter label is usually preset and constant. For example, if the communication attribute parameter is a contact identifier, a parameter label of the communication attribute parameter is "contact identifier". For another example, if the communication attribute parameter is an email address, the parameter label of the communication attribute parameter is "email address".

The communication attribute parameter may be a parameter such as a contact name, a telephone number or an email address. It is assumed that current contact information A1 is: a contact name "Li Si", a telephone number "13000012311", and an email address "13000012311@163.com". All communication attribute parameters of the contact information A1 are the contact name, the telephone number, and the email address. When the communication attribute parameter is the contact name, correspondingly, the parameter content is "Li Si", and the parameter label is "contact name". When to communication attribute parameter is the telephone number, correspondingly, the parameter content is "13000012311", and the parameter label is "telephone number". When the communication attribute parameter is the email address, correspondingly, the parameter content is "13000012311@163.com", and the parameter label is "email address".

After the contact information provided by the terminal is obtained, because the contact information includes communication attribute parameters, some communication attribute parameters may be used as the preset communication attribute parameter. For example, the preset communication attribute parameter may be a contact identifier and a communication number. In this embodiment of the present disclosure, a description is given by using an example in which the preset communication attribute parameter is a contact identifier and a communication number and the parameter characteristic includes parameter content and a parameter label. The contact identifier may be a contact name, or may be another identifier used for representing the contact. The communication number may be a telephone number, or may be another communication number corresponding to the contact.

Step 302: Detect whether parameter content of a contact identifier in the contact information is empty.

The contact identifier may be a contact name. Therefore, it may be detected whether parameter content of the contact name in the contact information is empty.

Step 303: If the parameter content of the contact identifier in the contact information is empty, detect whether a parameter label of a communication number in the contact information is a preset label.

The communication number may be a telephone number. It is assumed that current contact information A2 is: a contact name "", a telephone number "13000012312", and an email address "13000012312@163.com". As can be seen, parameter content of the contact name in the contact information A2 is empty. Therefore, it may further be detected whether a parameter label of the telephone number in the contact information A2 is a preset label (that is “telephone number”). In this embodiment of the present disclosure, the preset label refers to a conventional label, and the conventional label generally does not carry a special character such as ~, 190 , ˆor &. Therefore, if the parameter label of the telephone number in the contact information carries, but is not limited to, the foregoing special character, it may be determined that the parameter label of the telephone number in the contact information is not a preset label. If the parameter label of the telephone number in the contact information does not carry the foregoing special character, it may be determined that the parameter label of the telephone number in the contact information is a preset label. For example, the parameter label of the telephone number in the contact information A2 does not carry a special character. Therefore, the parameter label is a preset label.

Table 1 shows a data structure and data content for storing contact information. The contact information is manually added by a user to a contact list on the terminal. Therefore, parameter content of a contact name in the contact information is not empty, and a preset communication attribute parameter in the contact information is not an abnormal attribute parameter. FIG. 3-2 shows a schematic diagram that the terminal displays the contact information in Table 1.

TABLE 1

| Contact name | Telephone number | Email address |
|---|---|---|
| Xiao Hong | 18200012366 | 18200012366@qq.com |

Table 2 shows a data structure and data content for storing the contact information A2. The parameter content of the contact name in the contact information is empty. Therefore, it needs to be detected whether the parameter label of the communication number in the contact information is a preset label.

TABLE 2

| Contact name | Telephone number | Email address |
|---|---|---|
| | 13000012312 | 13000012312@163.com |

Step 304: If the parameter label of the communication number in the contact information is not a preset label, determine that the preset communication attribute parameter in the contact information is an abnormal attribute parameter.

It is assumed that current contact information A3 is: a contact name “”, a ˆtelephone number “13000012313”, and an email address “13000012313@163.com”. Because parameter content of the contact name in the contact information A3 is empty, the parameter label of the telephone number carries a special character “ˆ”, and the parameter label of the telephone number is not a preset label, it is determined that a preset communication attribute parameter in the contact information is an abnormal attribute parameter. Table 3 shows a data structure and data content for storing the contact information A3. A server may detect, by reading the data content of the contact information, that the parameter content of the contact name in the contact information A3 is empty, and the parameter label of the telephone number carries a special character “ˆ”.

TABLE 3

| Contact name | ˆTelephone number | Email address |
|---|---|---|
| | 13000012313 | 13000012313@163.com |

It is noted that in actual application, the parameter label of the communication attribute parameter may be represented by using letters. For example, “contact name” may be replaced by “name” for representation, “telephone number” may be replaced by “haoma” for representation, and “email address” may be replaced by “Email” for representation. In this embodiment of the present disclosure, the parameter label or the parameter content of the preset communication attribute parameter of the abnormal contact information carries a special character. For example “haoma” carries a special character, and becomes “ˆhaoma”.

Step 305: Determine, if the preset communication attribute parameter in the contact information is an abnormal attribute parameter, whether a rule base stores a filtering rule indicating a parameter characteristic of the abnormal attribute parameter.

The rule base is used for storing a filtering rule for detecting an abnormal contact. For example, the filtering rule may be: contact information is abnormal contact information when parameter content of a contact identifier in the contact information is empty and a parameter label of a communication number in the contact information carries a special character “ˆ”. It is assumed that the current contact information A3 is: a contact name “”, a “ˆtelephone number “13000012313”, and an email address “13000012313@163.com”. The parameter content of the contact name in the contact information is empty, and the parameter label of the telephone number carries a special character “ˆ”, the preset communication attribute parameter is an abnormal attribute parameter, and the rule base stores a filtering rule that contact information is abnormal contact information when parameter content of a contact identifier in the contact information is empty and a parameter label of a communication number in the contact information carries a special character “ˆ”. Therefore, it is considered that the rule base stores a filtering rule indicating the parameter characteristic of the abnormal attribute parameter.

Step 306: Generate, if the rule base does not store the filtering rule indicating the parameter characteristic of the abnormal attribute parameter, a target filtering rule indicating the parameter characteristic of the abnormal attribute parameter, according to the abnormal attribute parameter.

Using the contact information A3 in step 305 as an example, assuming that the current rule base does not store a filtering rule that contact information is abnormal contact information when parameter content of a contact identifier in the contact information is empty and a parameter label of a communication number in the contact information carries a special character “ˆ”, and stores a filtering rule that contact information is abnormal contact information when parameter content of a contact identifier in the contact information is empty and a parameter label of a communication number in the contact information carries a special character “~” or “#”, a target filtering rule indicating the parameter characteristic of the abnormal attribute parameter is generated according to the abnormal attribute parameter of the contact information A3, where the target filtering rule is that contact information is abnormal contact information when parameter content of a contact identifier in the contact information is empty and a parameter label of a communication number in the contact information carries a special character “ˆ”.

Step 307: Add the target filtering rule to the rule base to obtain an updated rule base.

The rule base is used for storing a filtering rule for detecting abnormal contact information. Therefore, if a quantity of filtering rules in the rule base is relatively small, and the filtering rules are relatively monotonous, an effect of detecting abnormal contact information is directly affected. The detection effect includes the length of a time used for detecting abnormal contact information and the accuracy of detecting abnormal contact information.

It is noted that the existing rule base is established by the server according to a preset rule. Each time when the rule base is updated, a rule is manually added to or deleted from the rule base. First, the contact information is manually analyzed, and then a filtering rule is extracted. Efficiency of manual analysis is relatively low, and timeliness is relatively short. In addition, filtering rules in the rule base are liable to errors. Moreover, each time of updating the rule base has highly repetitive operations.

In this embodiment of the present disclosure, a new filtering rule is generated in real time, and the rule base keeps being updated, so that a quantity of rules in the rule base increases and the rules are more varied. Therefore, abnormal contact information can be detected more efficiently. In particular, abnormal contact information that is generated by a third-party application installed on the terminal and is added to the contact list can be detected more efficiently. The third-party application is an application that is not originally installed on the terminal.

Step 308: Send the updated rule base to the terminal, so that the terminal detects abnormal contact information according to a filtering rule in the updated rule base.

After adding the target filtering rule to the rule base to obtain the updated rule base, the server sends the filtering rule in the rule base to the terminal. The terminal reads all contact information in the local contact list, and detects all the contact information according to the filtering rule.

Optionally, in this method, after the updated rule base is sent to the terminal, a rule deletion message sent by the terminal may further be received. The rule deletion message is used for indicating an invalid filtering rule, and the invalid filtering rule is a filtering rule that is in the updated rule base and is not used by the terminal within preset duration. The invalid filtering rule is then deleted according to the rule deletion message after the rule deletion message sent by the terminal is received.

For example, the updated rule base obtained by the server includes ten filtering rules. The server sends the updated rule base to the terminal. The terminal detects abnormal contact information according to the filtering rules in the updated rule base. If one of the ten filtering rules is not used by the terminal within one month, assuming that the filtering rule is G1, the terminal may use G1 as an invalid filtering rule, and send the rule deletion message to the server. After receiving the rule deletion message, the server determines that G1 in the updated rule base that is previously obtained is the invalid filtering rule. Therefore, the server may delete G1. In this way, the rule base is updated in real time by deleting the invalid filtering rule in time, so that the terminal can more efficiently detect abnormal contact information by using a filtering rule in the rule base. In addition, because an invalid filtering rule is deleted, space is further saved.

It is noted that "determine whether a rule base stores a filtering rule indicating a parameter characteristic of the abnormal attribute parameter" in step 305, and "if the rule base does not state the filtering rule indicating the parameter characteristic of the abnormal attribute parameter" in step 306 are optional steps. If the preset communication attribute parameter in the contact information is an abnormal attribute parameter, before the target filtering rule indicating the parameter characteristic of the abnormal attribute parameter is generated according to the abnormal attribute parameter, it may be first determined whether the rule base stores the filtering rule indicating the parameter characteristic of the abnormal attribute parameter. If the rule base stores the filtering rule indicating the parameter characteristic of the abnormal attribute parameter, the target filtering rule does not need to be generated. If the rule base does not store the filtering rule indicating the parameter characteristic of the abnormal attribute parameter, the target filtering rule is then generated. In this way, it is ensured that no repetitive filtering rules exist in the rule base, so that the terminal can more efficiently detect abnormal contact information by using the rule base. In addition, space is further saved.

In conclusion, according to the method for detecting abnormal contact information provided in this embodiment of the present disclosure, a server can obtain contact information provided by a terminal, determine whether a preset communication attribute parameter in the contact information is an abnormal attribute parameter, generate, if a rule base does not store a filtering rule indicating a parameter characteristic of the abnormal attribute parameter, a target filtering rule indicating the parameter characteristic of the abnormal attribute parameter, according to the abnormal attribute parameter, and add the target filtering rule to the rule base to obtain an updated rule base, so that the terminal detects abnormal contact information according to the updated rule base. In addition, the server can delete an invalid filtering rule in time. Compared with a related technology for detecting abnormal contact information, a rule does not need to be manually added to or deleted from the rule base, a quantity of rules in the rule base is increased, and rules become varied. Therefore, the accuracy and efficiency of detection are improved.

Figure 4:
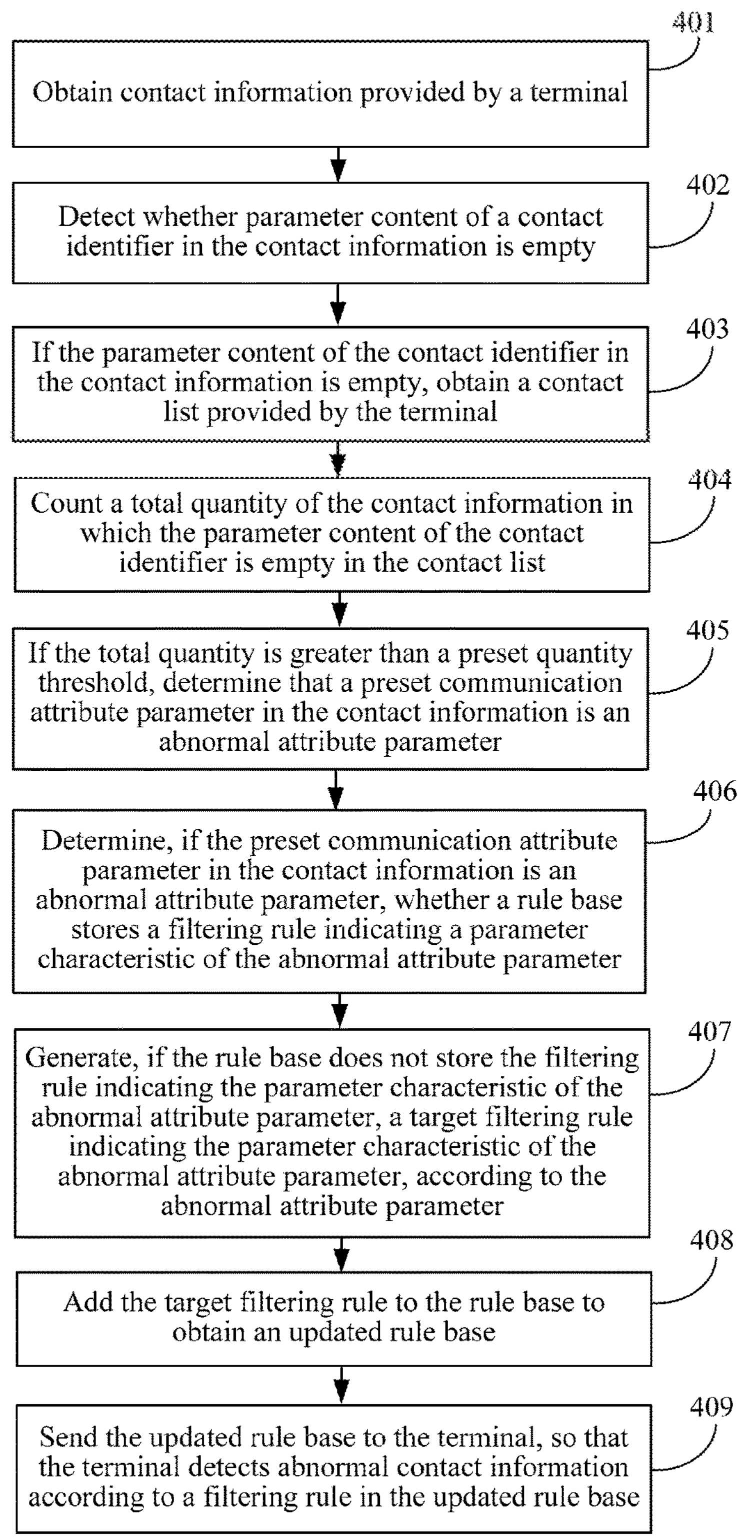
FIG. 4 is a method flowchart of still another method for detecting abnormal contact information according to an embodiment of the present disclosure.

Referring to FIG. 4, FIG. 4 is a method flowchart of still another method for detecting abnormal contact information according to an embodiment of the present disclosure. In this embodiment, a description is given by using an example in which the method is applied to the server 110 in the implementation environment shown in FIG. 1. The method may include:

Step 401: Obtain contact information provided by a terminal.

The contact information includes at least one communication attribute parameter. A parameter characteristic of the communication attribute parameter is used for representing an attribute of a contact in communication. For example, the parameter characteristic may include parameter content, and the parameter content is content filled in the communication attribute parameter. After the contact information provided by the terminal is obtained, because the contact information includes the communication attribute parameters, some communication attribute parameters may be used as the preset communication attribute parameter. For example, the preset communication attribute parameter may be a contact identifier and a communication number. In this embodiment of the present disclosure, a description is given by using an example in which the preset communication attribute parameter is a contact identifier and a communication number and the parameter characteristic includes parameter content. For details of step 401, refer to the description in step 301, and details are not described herein again.

Step 402: Detect whether parameter content of a contact identifier in the contact information is empty.

The contact identifier may be a contact name. Therefore, it may be detected whether the parameter content of the contact name in the contact information is empty.

Step 403: If the parameter content of the contact identifier in the contact information is empty, obtain a contact list provided by the terminal, The contact list provided by the terminal includes the contact information. It is assumed that current contact information A2 is: a contact name "", a telephone number "13000012312", and an email address "13000012312@163.com". Because the parameter content of the contact name in the contact information is empty, the contact list provided by the terminal is obtained.

Step 404: Count a total quantity of the contact information in which the parameter content of the contact identifier is empty in the contact list.

Using the contact information A2 in step 403 as an example, a total quantity of the contact information A2 in the contact list is counted.

Step 405: If the total quantity is greater than a preset quantity threshold, determine that the preset communication attribute parameter in the contact information is an abnormal attribute parameter.

For example, the preset quantity threshold may be equal to 50. If the total quantity that is counted in step 404 and is of the contact information A2 in the contact list is 100, it is determined that the preset communication attribute parameter in the contact information A2 is an abnormal attribute parameter.

Step 406: Determine, if the preset communication attribute parameter in the contact information is an abnormal attribute parameter, whether a rule base stores a filtering rule indicating a parameter characteristic of the abnormal attribute parameter.

The rule base is used for storing a filtering rule for detecting an abnormal contact. For example, the filtering rule may be contact information is abnormal contact information when parameter content of a contact identifier in the contact information is empty and a total quantity of the contact information in which the parameter content of the contact identifier is empty in the contact list is 100. It is assumed that the current contact information A2 is: a contact name "", a telephone number "13000012312", and an email address "13000012312@163.com. The parameter content of the contact name in the contact information is empty, the total quantity of the contact information A2 is 100, the preset communication attribute parameter is an abnormal attribute parameter, and the rule base stores a filtering rule that contact information is abnormal contact information when parameter content of a contact identifier in the contact information is empty and a total quantity of the contact information is 100. In this case, it is considered that the rule base stores a filtering rule indicating the parameter characteristic of the abnormal attribute parameter.

Step 407: Generate, if the rule base does not store the filtering rule indicating the parameter characteristic of the abnormal attribute parameter, a target filtering rule indicating the parameter characteristic of the abnormal attribute parameter, according to the abnormal attribute parameter.

Using the contact information A2 in step 406 as an example, assuming that the current rule base does not store a filtering rule that contact information is abnormal contact information when parameter content of a contact identifier in the contact information is empty and a total quantity of the contact information is 100, and stores a filtering rule contact information is abnormal contact information when parameter content of a contact identifier in the contact information is empty and a total quantity of the contact information is 70, a target filtering rule indicating the parameter characteristic of the abnormal attribute parameter is generated according to the abnormal attribute parameter of the contact information A2, where the target filtering rule is that contact information is abnormal contact information when parameter content of a contact identifier in the contact information is empty and a total quantity of the contact information is 100.

Step 408: Add the target filtering rule to the rule base to obtain an updated rule base.

The rule base is used for storing a filtering rule for detecting abnormal contact information. Therefore, if a quantity of filtering rules in the rule base is relatively small, and the filtering rules are relatively monotonous, an effect of detecting abnormal contact information is directly affected. The detection effect includes the length of a time used for detecting abnormal contact information and the accuracy of detecting abnormal contact information.

Step 409: Send the updated rule base to the terminal, so that the terminal detects abnormal contact information according to a filtering rule in the updated rule base.

After adding the target filtering rule to the rule base to obtain the updated rule base, the server sends the filtering rule in the rule base to the terminal. The terminal reads all contact information in the local contact list, and detects all the contact information according to the filtering rule.

Optionally, in this method, after the updated rule base is sent to the terminal, a rule deletion message sent by the terminal may further be received. The rule deletion message is used for indicating an invalid filtering rule, and the invalid filtering rule is a filtering rule that is in the updated rule base and is not used by the terminal within preset duration. The invalid filtering rule is ten deleted according to the rule deletion message after the rule deletion message sent by the terminal is received. The rule base is updated in real time by deleting the invalid, filtering rule in time, so that the terminal can more efficiently detect abnormal contact information by using the rule base. In addition, because an invalid filtering rule is deleted, space is further saved.

It is noted that "Determine whether a rule base stores a filtering rule indicating a parameter characteristic of the abnormal attribute parameter" in step 406, and "if the rule base does not store the filtering rule indicating the parameter characteristic of the abnormal attribute parameter" in step 407 are optional steps. It is ensured that no repetitive filtering rules exist in the rule base, so that the terminal can more efficiently detect abnormal contact information by using a filtering rule in the rule base. In addition, space is further saved.

In conclusion, according to the method for detecting abnormal contact information provided in this embodiment of the present disclosure, a server can obtain contact information provided by a terminal, determine whether a preset communication attribute parameter in the contact information is an abnormal attribute parameter, generate, if a rule base does not store a filtering rule indicating a parameter characteristic of the abnormal attribute parameter, a target filtering rule indicating the parameter characteristic of the abnormal attribute parameter, according to the abnormal attribute parameter, and add the target filtering rule to the rule base to obtain an updated rule base, so that the terminal detects abnormal contact information according to the updated rule base. In addition, the server can delete an invalid filtering rule in time. Compared with a related technology for detecting abnormal contact information, a rule does not need to be manually added to or deleted from the rule base, a quantity of rules in the rule base is increased, and rules become varied. Therefore, the accuracy and efficiency of detection are improved.

Figure 5:
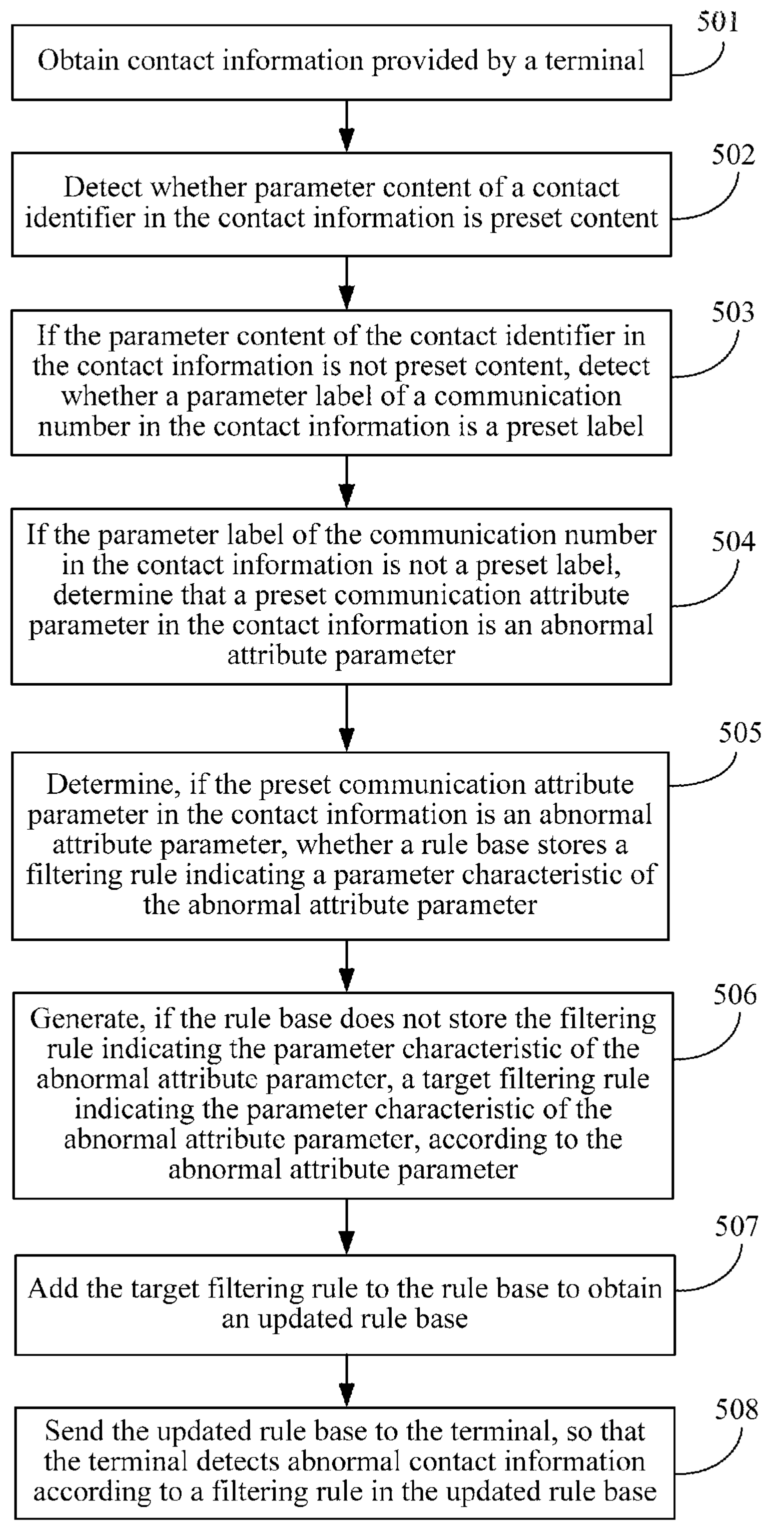
FIG. 5 is a method flowchart of yet another method for detecting abnormal contact information according to an embodiment of the present disclosure.

Referring to FIG. 5, FIG. 5 is a method flowchart of yet another method for detecting abnormal contact information according to an embodiment of the present disclosure. In this embodiment, a description is given by using an example in which the method is applied to the server 110 in the implementation environment shown in FIG. 1. The method may include:

Step 501: Obtain contact information provided by a terminal.

The contact information includes at least one communication attribute parameter. A parameter characteristic of the communication attribute parameter is used for representing an attribute of a contact in communication. For example, the parameter characteristic may include parameter content and a parameter label. The parameter content is content filled in the communication attribute parameter, and the parameter label is used for identifying the communication attribute parameter. After the contact information provided by the terminal is obtained, because the contact information includes the communication attribute parameters, some communication attribute parameters may be used as the preset communication attribute parameter. For example, the preset communication attribute parameter may be a contact identifier and a communication number. In this embodiment of the present disclosure, a description is given by using an example in which the preset communication attribute parameter is a contact identifier and a communication number and the parameter characteristic includes parameter content and a parameter label. For details of step 501, refer to the description in step 301, and details are not described herein again.

Step 502: Detect whether parameter content of a contact identifier in the contact information is preset content.

It is assumed that current contact information A4 is: a contact name "Wang Wu &&" a ^telephone number "11000012314", and an email address "13000012314@163.com". As can be seen, parameter content of the contact name in the contact information A4 is "Wang Wu &&". The preset content in this embodiment of the present disclosure refers to conventional content, and the conventional content generally does not carry a special character such as "or &&. Therefore, if the parameter content of the contact name in the contact information carries, but is not limited to, the foregoing special character, it may be determined that the parameter content of the contact name in the contact information is not preset content. If the parameter content of the contact name in the contact information does not carry the foregoing special character, it may be determined that the parameter content of the contact name in the contact information is preset content. The parameter content of the contact name in the contact information A4 carries a special character. Therefore, the parameter content is not preset content.

Step 503: If the parameter content of the contact identifier in the contact information is not preset content, detect whether a parameter label of a communication number in the contact information is a preset label.

The communication number may be a telephone number. It is assumed that the current contact information A4 is: a contact name "Wang Wu &&", a ^telephone number "13000012314", and an email address "13000012314@163.com". As can be seen, the parameter content of the contact name in the contact information A4 is not preset content. Therefore, it may further be detected whether a parameter label of the telephone number in the contact information A4 is a preset label. In this embodiment of the present disclosure, the preset label refers to a conventional label, and the conventional label generally does not carry a special character such as ~, #, ^ or &. Therefore, if the parameter label of the telephone number in the contact information carries, but is not limited to, the foregoing special character, it may be determined that the parameter label of the telephone number in the contact information is not a preset label. If the parameter label of the telephone number in the contact information does not carry the foregoing special character, it may be determined that the parameter label of the telephone number in the contact information is a preset label. For example, the parameter label of the telephone number in the contact information A4 carries a special character. Therefore, the parameter label is not a preset label.

Step 504: If the parameter label of the communication number in the contact information is not a preset label, determine that a preset communication attribute parameter in the contact information is an abnormal attribute parameter.

If the parameter label of the telephone number in the contact information A4 in step 503 is not a preset label, it is determined that the preset communication attribute parameter in the contact information A4 is an abnormal attribute parameter.

Step 505: Determine, if the preset communication attribute parameter in the contact information is an abnormal attribute parameter, whether a rule base stores a filtering rule indicating a parameter characteristic of the abnormal attribute parameter.

The rule base is used for storing a filtering rule for detecting an abnormal contact. For example, the filtering rule may be: contact information is abnormal contact information when parameter content of a contact identifier in the contact information carries a special character "*" and a parameter label of a communication number in the contact information carries a special character "^". It is assumed that the current contact information A4 is: a contact name "Wana Wu &&", a ^telephone number "13000012314", and an email address "13000012314@163.com". The parameter content of the contact name in the contact information A4 carries a special character "&&", the parameter label of the telephone number carries a special character "^", the preset communication attribute parameter is an abnormal attribute parameter, and the rule base stores a filtering rule that contact information is abnormal contact information when parameter content of a contact identifier in the contact information carries a special character "&&" and a parameter label of a communication number in the contact information carries a special character "^". Therefore, it is considered that the rule base stores the filtering rule indicating the parameter characteristic of the abnormal attribute parameter.

Step 506: Generate, if the rule base does not store the filtering rule indicating the parameter characteristic of the abnormal attribute parameter, a target filtering rule indicating the parameter characteristic of the abnormal attribute parameter, according to the abnormal attribute parameter.

Using the contact information A4 in step 505 as an example, if the current rule base does not store a filtering rule that contact information is abnormal contact information when parameter content of a contact identifier in the contact information carries a special character "&&" and a parameter label of a communication number in the contact information carries a special character "^", and stores a filtering rule that contact information is abnormal contact information when parameter content of a contact identifier in the contact information carries a special character "*" and a parameter label of a communication number in the contact information carries a special character "^", a target filtering rule indicating the parameter characteristic of the abnormal attribute parameter is generated according to the abnormal attribute parameter of the contact information A4, where the target filtering rule is that contact information is abnormal contact information when parameter content of a contact identifier in the contact information carries a special character "&&" and a parameter label of a communication number in the contact information carries a special character "^".

Step 507: Add the target filtering rule to the rule base to obtain an updated rule base.

Step 508: Send the updated rule base to the terminal, so that the terminal detects abnormal contact information according to a filtering rule in the updated rule base.

Optionally, in this method, after the updated rule base is sent to the terminal, a rule deletion message sent by the terminal may further be received. The rule deletion message is used for indicating an invalid filtering rule, and the invalid filtering rule is a filtering rule that is in the updated rule base and is not used by the terminal within preset duration. The invalid filtering rule is then deleted according to the rule deletion message after the rule deletion message sent by the terminal is received. The rule base is updated in real time by deleting the invalid filtering rule in time, so that the terminal can more efficiently detect abnormal contact information by using a filtering rule in the rule base. In addition, because an invalid filtering rule is deleted, space is further saved.

It is noted that "Determine whether a rule base stores a filtering rule indicating a parameter characteristic of the abnormal attribute parameter" in step 505, and "if the rule base does not store the filtering rule indicating the parameter characteristic of the abnormal attribute parameter" in step 506 are optional steps. It is ensured that no repetitive filtering rules exist in the rule base, so that the terminal can more efficiently detect abnormal contact information by using the rule base. In addition, space is further saved.

In conclusion, according to the method for detecting abnormal contact information provided in this embodiment of the present disclosure, a server can obtain contact information provided by a terminal, determine whether a preset communication attribute parameter in the contact information is an abnormal attribute parameter, generate, if a rule base does not store a filtering rule indicating a parameter characteristic of the abnormal attribute parameter, a target filtering rule indicating the parameter characteristic of the abnormal attribute parameter, according to the abnormal attribute parameter, and add the target filtering rule to the rule base to obtain an updated rule base, so that the terminal detects abnormal contact information according to the updated rule base. In addition, the server can delete an invalid filtering rule in time. Compared with a related technology for detecting abnormal contact information, a rule does not need to be manually added to or deleted from the rule base, a quantity of rules in the rule base is increased, and rules become varied. Therefore, the accuracy and efficiency of detection are improved.

Figure 6:
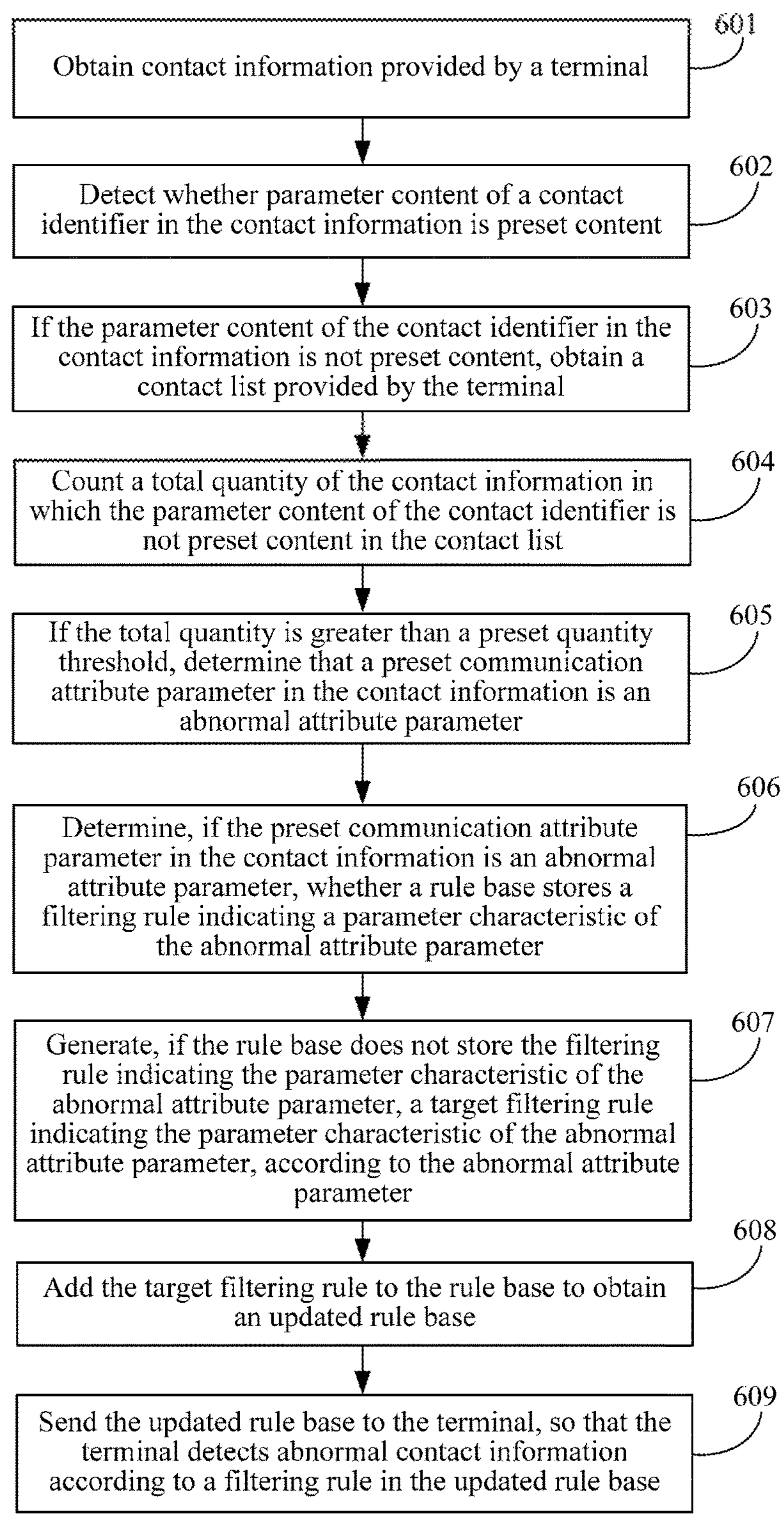
FIG. 6 is a method flowchart of a method for detecting abnormal contact information according to another embodiment of the present disclosure.

Referring to FIG. 6, FIG. 6 is a method flowchart of a method for detecting abnormal contact information according to another embodiment of the present disclosure. In this embodiment, a description is given by using an example in which the method is applied to the server 110 in the implementation environment shown in FIG. 1. The method may include:

Step 601: Obtain contact information provided by a terminal.

The contact information includes at least one communication attribute parameter. A parameter characteristic of the communication attribute parameter is used for representing an attribute of a contact in communication. For example, the parameter characteristic may include parameter content, and the parameter content is content filled in the communication attribute parameter. After the contact information provided by the terminal is obtained, because the contact information includes the communication attribute parameters, some communication attribute parameters may be used as the preset communication attribute parameter. For example, a preset communication attribute parameter may be a contact identifier and a communication number. In this embodiment of the present disclosure, a description is given by using an example in which the preset communication attribute parameter is a contact identifier and a communication number and the parameter characteristic includes parameter content. For details of step 601, refer to the description in step 301, and details are not described herein again.

Step 602: Detect whether parameter content of a contact identifier in the contact information is preset content.

For details of step 602, refer to the description in step 502, and details are not described herein again.

Step 603: If the parameter content of the contact identifier in the contact information is not preset content, obtain a contact list provided by the terminal.

The contact list includes the contact information. It is assumed that current contact information A5 is: a contact name "Zhang Wu &&", a telephone number "13000012315", and an email address "13000012315@163.com". Because the parameter content of the contact name in the contact information is not preset content, the contact list provided by the terminal is obtained.

Step 604: Count a total quantity of the contact information in which the parameter content of the contact identifier is not preset content in the contact list.

Using the contact information A5 in step 603 as an example, the total quantity of the contact information A5 in the contact list is counted.

Step 605: If the total quantity is greater than a preset quantity threshold, determine that a preset communication attribute parameter in the contact information is an abnormal attribute parameter.

For example, the preset quantity threshold may be equal to 50. If the total quantity that is counted in step 604 and is of the contact information A5 in the contact list is 100, it is determined that the preset communication attribute parameter in the contact information A5 is an abnormal attribute parameter.

Step 606: Determine, if the preset communication attribute parameter in the contact information is an abnormal attribute parameter, whether a rule base stores a filtering rule indicating a parameter characteristic of the abnormal attribute parameter.

The rule base is used for storing a filtering rule for detecting an abnormal contact. For example, the filtering rule may be: contact information is abnormal contact information when parameter content of a contact identifier in the contact information carries a special character "*" and a total quantity of the contact information in which the parameter content of the contact identifier carries a special character "*" in the contact list is 100. The parameter content of the contact name in the contact information A5 in step 605 is not preset content, the total quantity is 100, the preset communication attribute parameter is an abnormal attribute parameter, and the rule base stores a filtering rule that contact information is abnormal contact information when parameter content of a contact identifier in the contact information carries a special character "&&" and a total quantity of the contact information in which the parameter content of the contact identifier carries a special character "&&" in the contact list is 100. Therefore, it is considered that the rule base stores the filtering rule indicating the parameter characteristic of the abnormal attribute parameter.

Step 607: Generate, if the rule base does not store the filtering rule indicating the parameter characteristic of the abnormal attribute parameter, a target filtering rule indicating the parameter characteristic of the abnormal attribute parameter, according to the abnormal attribute parameter.

Using the contact information A5 in step 606 as an example, assuming that the current rule base does not store a filtering rule that contact information is abnormal contact information when parameter content of a contact identifier in the contact information carries a special character "&&" and a total quantity of contact information in which the parameter content of the contact identifier carries a special character "&&" in the contact list is 100, and stores a filtering rule that contact information is abnormal contact information when parameter content of a contact identifier in the contact information carries a special character "&&" and a total quantity of the contact information in which the parameter content of the contact identifier carries a special character "&&" in the contact list is 70,a target filtering rule indicating the parameter characteristic of the abnormal attribute parameter is generated according to the abnormal attribute parameter of the contact information A5, where the target filtering rule is that contact information is abnormal contact information when parameter content of a contact identifier in the contact information carries a special character "&&" and a total quantity of the contact information in which the parameter content of the contact identifier carries a special character "&&" in the contact list is 100.

Step 608: Add the target filtering rule to the rule base to obtain an updated rule base.

Step 609: Send the updated rule base to the terminal, so that the terminal detects abnormal contact information according to a filtering rule in the updated rule base.

Optionally, in this method, after the updated rule base is sent to the terminal, a rule deletion message sent by the terminal may further be received. The rule deletion message is used for indicating an invalid filtering rule, and the invalid filtering rule, is a filtering rule that is in the updated rule base and is not used by the terminal within preset duration. The invalid filtering rule is then deleted according to the rule deletion message after the rule deletion message sent by the terminal is received. The rule base is updated in real time by deleting the invalid filtering rule in time, so that the terminal can more efficiently detect abnormal contact information by using the rule base. In addition, because an invalid filtering rule is deleted, space is further saved.

It is noted that "Determine whether a rule base stores a filtering rule indicating a parameter characteristic of the abnormal attribute parameter" in step 606, and "if the rule base does not store the filtering rule indicating the parameter characteristic of the abnormal attribute parameter" in step 607 are optional steps. It is ensured that no repetitive filtering rides exist in the rule base, so that the terminal can more efficiently detect abnormal contact information by using the rule base. In addition, space is further saved.

In conclusion, according to the method for detecting abnormal contact information provided in this embodiment of the present disclosure, a server can obtain contact information provided by a terminal, determine whether a preset communication attribute parameter in the contact information is an abnormal attribute parameter, generate, if a rule base does not store a filtering rule indicating a parameter characteristic of the abnormal attribute parameter, a target filtering rule indicating the parameter characteristic of the abnormal attribute parameter, according to the abnormal attribute parameter, and add the target filtering rule to the rule base to obtain an updated rule base, so that the terminal detects abnormal contact information accordion to the updated rule base. In addition, the server can delete an invalid filtering rule in time. Compared with a related technology for detecting abnormal contact information, a rule does not need to be manually added to or deleted from the rule base, a quantity of rules in the rule base is increased, and rules become varied. Therefore, the accuracy and efficiency of detection are improved.

Figures 1, 7:
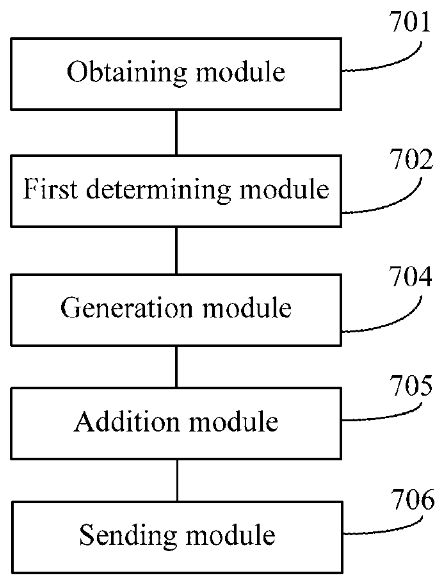
Figures 2, 7:
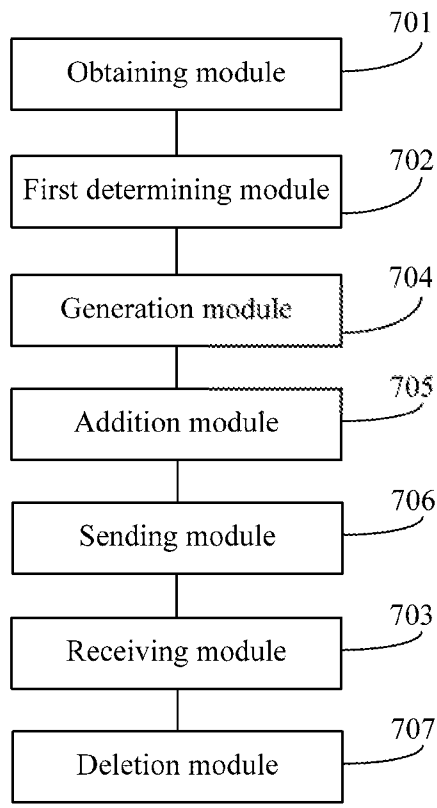

Referring to FIG. 7-1, FIG. 7-1 is a schematic structural diagram of an apparatus for detecting abnormal contact information according to an embodiment of the present disclosure. The apparatus is applied to a server, and includes:

an obtaining module 701, configured to obtain contact information provided by a terminal, where the contact information includes at least one communication attribute parameter, and a parameter characteristic of the communication attribute parameter is used for representing an attribute of a contact in communication;

a first determining module 702, configured to determine whether a preset communication attribute parameter in the contact information is an abnormal attribute parameter;

a generation module 704, configured to generate, if the preset communication attribute parameter in the contact information is an abnormal attribute parameter, a target filtering rule indicating a parameter characteristic of the abnormal attribute parameter, according to the abnormal attribute parameter;

an addition module 705, configured to add the target filtering rule to a rule base to obtain an updated rule base; and a sending module 706, configured to send the updated rule base to the terminal, so that the terminal detects abnormal contact information according to a filtering rule in the updated rule base.

In conclusion, according to the apparatus for detecting abnormal contact information provided in this embodiment of the present disclosure, a server can obtain contact information provided by a terminal, determine whether a preset communication attribute parameter in the contact information is an abnormal attribute parameter, and generate, when the preset communication attribute parameter in the contact information is an abnormal attribute parameter, a target filtering rule indicating a parameter characteristic of the abnormal attribute parameter, according to the abnormal attribute parameter, and add the target filtering rule to a rule base to obtain an updated rule base, so that the terminal detects abnormal contact information according to the updated rule base. Compared with a related technology for detecting abnormal contact information, a rule does not need to be manually added to a rule base, a quantity of rules in the rule base is increased, and rules become varied. Therefore, the accuracy and efficiency of detection are improved.

Optionally, the preset communication attribute parameter is a contact identifier and a communication number, the parameter characteristic includes parameter content and a parameter label, the parameter content is content filled in the communication attribute parameter, the parameter label is used for identifying the communication attribute parameter, and the first determining module 702 is configured to:

detect whether parameter content of the contact identifier in the contact information is empty;

if the parameter content of the contact identifier in the contact information is empty, detect whether a parameter label of the communication number in the contact information is a preset label; and if the parameter label of the communication number in the contact information is not a preset label, determine that the preset communication attribute parameter in the contact information is an abnormal attribute parameter.

Optionally, the preset communication attribute parameter is a contact identifier and a communication number, the parameter characteristic includes parameter content, the parameter content is content filled in the communication attribute parameter, and the first determining module 702 is configured to:

detect whether parameter content of the contact identifier in the contact information is empty;

if the parameter content of the contact identifier in the contact information is empty, obtain a contact list provided by the terminal, where the contact list includes the contact information;

count a total quantity of the contact information in which the parameter content of the contact identifier is empty in the contact list; and if the total quantity is greater than a preset quantity threshold, determine that the preset communication attribute parameter in the contact information is an abnormal attribute parameter.

Optionally, the preset communication attribute parameter is a contact identifier and a communication number, the parameter characteristic includes parameter content and a parameter label, the parameter content is content filled in the communication attribute parameter, the parameter label is used for identifying the communication attribute parameter, and the first determining module 702 is configured to:

detect whether parameter content of the contact identifier in the contact information is preset content;

if the parameter content of the contact identifier in the contact information is not preset content, detect whether a parameter label of the communication number in the contact information is a preset label; and if the parameter label of the communication number in the contact information is not a preset label, determine that the preset communication attribute parameter in the contact information is an abnormal attribute parameter.

Optionally, the preset communication attribute parameter is a contact identifier and a communication number, the parameter characteristic includes parameter content, the parameter content is content filled in the communication attribute parameter, and the first determining module 702 is configured to:

detect whether parameter content of the contact identifier in the contact information is preset content;

if the parameter content of the contact identifier in the contact information is not preset content, obtain a contact list provided by the terminal, where the contact list includes the contact information;

count a total quantity of the contact information in which the parameter content of the contact identifier is not preset content in the contact list; and if the total quantity is greater than a preset quantity threshold, determine that the preset communication attribute parameter in the contact information is an abnormal attribute parameter.

Optionally, the generation module 704 is configured to:

determine, if the preset communication attribute parameter in the contact information is an abnormal attribute parameter, whether the rule base stores a filtering rule indicating the parameter characteristic of the abnormal attribute parameter; and generate, if the rule base does not store the filtering rule indicating the parameter characteristic of the abnormal attribute parameter, a target filtering rule indicating the parameter characteristic of the abnormal attribute parameter, according to the abnormal attribute parameter.

Optionally, as shown in FIG. 7-2, the apparatus may further include:

a receiving module 703, configured to receive a rule deletion message sent by the terminal, where the rule deletion message is used for indicating an invalid filtering rule, and the invalid filtering rule is a filtering rule that is in the updated rule base and is not used by the terminal within preset duration; and a deletion module 707, configured to delete the invalid filtering rule according to the rule deletion message.

In addition, meanings of other reference signs in FIG. 7-2 may be described with reference to FIG. 7-1.

Optionally, the contact identifier is a contact name, and the communication number is a telephone number.

It may be clearly understood by a person skilled in the art that for the purpose of convenient and brief description, for detailed working processes of the foregoing modules, refer to corresponding processes in the foregoing method embodiments, and details are not described herein again.

In conclusion, according to the apparatus for detecting abnormal contact information provided in this embodiment of the present disclosure, a server can obtain contact information provided by a terminal, determine whether a preset communication attribute parameter in the contact information is an abnormal attribute parameter, generate, if a rule base does not store a filtering rule indicating a parameter characteristic of the abnormal attribute parameter, a target filtering rule indicating the parameter characteristic of the abnormal attribute parameter, according to the abnormal attribute parameter, and add the target filtering rule to the rule base to obtain an updated rule base, so that the terminal detects abnormal contact information according to the updated rule base. In addition, the server can delete an invalid filtering rule in time. Compared with a related technology for detecting abnormal contact information, a rule does not need to be manually added to or deleted from the rule base, a quantity of rules in the rule base is increased, and rules become varied. Therefore, the accuracy and efficiency of detection are improved.

An embodiment of the present disclosure provides a system for detecting abnormal contact information, including a server and a terminal. The server may include the apparatus for detecting abnormal contact information shown in FIG. 7-1 or FIG. 7-2.

Figure 8:
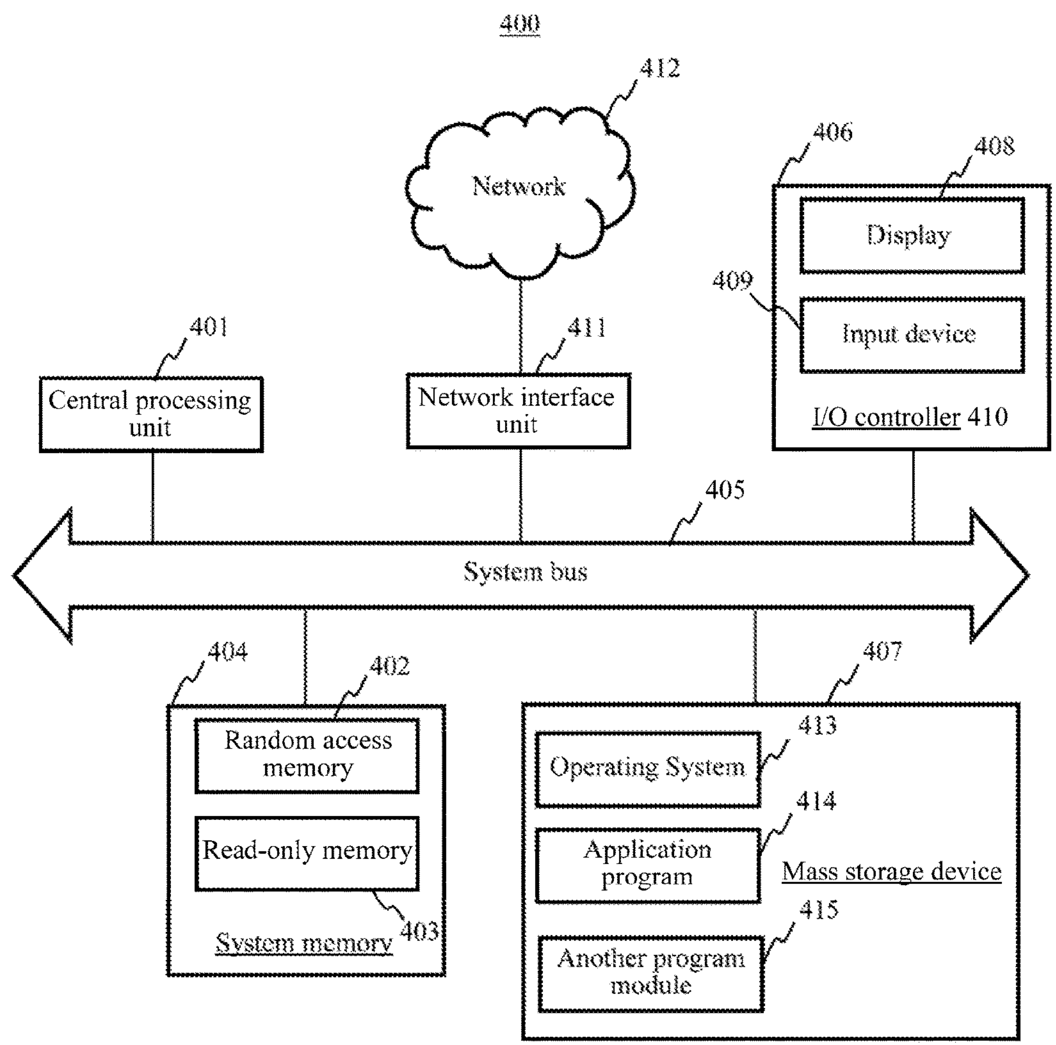
FIG. 8 is a schematic structural diagram of a server according to an embodiment of the present disclosure.

Referring to FIG. 8, FIG. 8 is a schematic structural diagram of a server according to an embodiment of the present disclosure. The server may be the server in the foregoing embodiments.

A server 400 includes: a central processing unit (CPU) 401, a system memory 404 including a random access memory (RAM) 402 and a read-only memory (ROM) 403, and a system bus 405 connecting the system memory 404 to the CPU 401. The server 400 further includes a basic input/output (I/O) system 406 that facilitates information transmission between components in a computer and a mass storage device 407 that is configured to store an operating system 413, an application program 414, and another program module 415.

The basic I/O system 406 includes a display 408 configured to display information and an input device 409 such as a mouse and a keyboard that is used by a user to input information. The display 408 and the input device 409 are both connected to the CPU 401 through an I/O controller 410 that is connected to the system bus 405. The basic I/O system 406 may further include the I/O controller 410 configured to receive and process inputs from multiple other devices such as a keyboard, a mouse, and an electronic stylus. Similarly, the I/O controller 410 further provides an output to a display screen, a printer, or others types of output devices.

The mass storage device 407 is connected to the CPU 401 through a mass storage controller (not shown) connected to the system bus 405. The mass storage device 407 and a related computer readable medium provide non-volatile storage to the server 400. That is, the mass storage device 407 may include a computer readable medium (not shown) such as a hard disk or a CD-ROM drive.

Without loss of generality, the computer readable medium may include a computer storage medium and a communications medium. The computer storage medium includes volatile, non-volatile, removable, and non-removable media that are implemented by using any method or technology and are configured to store information such as a computer readable instruction, a data structure, a program module, or other data. The computer storage medium can be implemented using any suitable storage, such as a random access memory (RAM), a read-only memory (ROM), an erasable programmable ROM (EPROM), an electrically erasable programmable ROM (EEPROM), a flash memory or another solid-state storage, a CD-ROM, a digital versatile disc (DVD) or another optical storage device, and a cassette, a magnetic tape, a disk storage device or another magnetic storage device. Certainly, a person skilled in the art may learn that the computer storage medium is not limited to the foregoing types. The system memory 404 and the mass storage device 407 may be generally referred to as a memory.

According to the embodiments of the present disclosure, the server 400 may be connected to a remote computer on a network such as the Internet through the network and is run. That is, the server 400 may be connected to a network 412 through a network interface unit 411 that is connected to the system bus 405, or may be connected to another type of network or a remote computer system (not shown) through the network interface unit 411.

The memory further includes one or more programs. The one or more programs are stored in the memory. The method for detecting abnormal contact information described in the foregoing embodiments is executed by configuring the CPU to execute the foregoing program.

In conclusion, the server provided in this embodiment of the present disclosure can obtain contact information provided by a terminal, determine whether a preset communication attribute parameter in the contact information is an abnormal attribute parameter, generate, if a rule base does not store a filtering rule indicating a parameter characteristic of the abnormal attribute parameter, a target filtering rule indicating the parameter characteristic of the abnormal attribute parameter, according to the abnormal attribute parameter, and add the target filtering rule to the rule base to obtain an updated rule base, so that the terminal detects abnormal contact information according to the updated rule base. In addition, the server can delete an invalid filtering rule in time. Compared with a related technology for detecting abnormal contact information, a rule does not need to be manually added to or deleted from the rule base, a quantity of rules in the rule base is increased, and rules become varied. Therefore, the accuracy and efficiency of detection are improved.

In an exemplary embodiment, a non-volatile storage medium including instructions is further provided, for example, a memory including instructions. The instructions may be executed by a CPU of a server, to implement the method for detecting abnormal contact information. For example, the non-volatile storage medium may be a ROM, a RAM, a CD-ROM, a magnetic tape, a floppy disk, an optical data storage device, and the like.

The sequence numbers of the foregoing embodiments of the present disclosure are used merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of the embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. An apparatus, comprising:

interface circuitry configured to receive contact information provided by a terminal device for a contact entry in the terminal device, the contact information comprising a first communication attribute parameter of contact identifier and a second communication attribute parameter of communication number, the first communication attribute parameter and the second communication attribute parameter each having a content characteristic; and processing circuitry configured to:

determine the contact information of the contact entry is abnormal with one or more abnormal parameter characteristics when a first condition and a second condition are satisfied;

generate, when the contact information of the contact entry is determined to be abnormal, a new filtering rule for filtering contact entries according to the one or more abnormal parameter characteristics;

add the filtering rule to a rule base to obtain an updated rule base; and send the updated rule base to the terminal device via the interface circuitry for the terminal device to filter contact entries in the terminal device according to the updated rule base, wherein the first condition is that the content characteristic of the first communication attribute parameter is empty or fails to satisfy a preset content characteristic, and the second condition is that a label characteristic of the second communication attribute parameter fails to satisfy a preset label characteristic or a count number of specific contact entries of a list of contact entries in which the content characteristic of the first communication attribute satisfies the first condition is greater than a preset threshold.

2. The apparatus according to claim 1, wherein the first communication attribute parameter and the second communication attribute parameter each have the label characteristic, and the processing circuitry is configured to:

detect whether the content characteristic of the first communication attribute parameter is empty;

when the content characteristic of the first communication attribute parameter is detected to be empty, detect whether the label characteristic of the second communication attribute parameter satisfies the preset label characteristic; and when the label characteristic of the second communication attribute parameter fails to satisfy the preset label characteristic, determine that the contact information of the contact entry is abnormal.

3. The apparatus according to claim 1, wherein the processing circuitry is configured to:

detect whether the content characteristic of the first communication attribute parameter is empty;

when the content characteristic of the first communication attribute parameter is determined to be empty, obtain contact information for the list of contact entries from the terminal device via the interface circuitry;

count the number of the specific contact entries of the list of contact entries in which the content characteristic of the first communication attribute parameter is empty; and when the number is greater than the preset threshold, determine that the contact information of the contact entry is abnormal.

4. The apparatus according to claim 1, wherein the first communication attribute parameter and the second communication attribute parameter each have the label characteristic, and the processing circuitry is configured to:

detect whether the content characteristic of the first communication attribute parameter satisfies the preset content characteristic;

when the content characteristic of the first communication attribute parameter fails to satisfy the preset content characteristic, detect whether the label characteristic of the first communication attribute parameter satisfies the preset label characteristic; and when the label characteristic of the first communication attribute parameter fails to satisfy the preset label characteristic, determine that the contact information of the contact entry is abnormal.

5. The apparatus according to claim 1, wherein the first communication attribute parameter and the second communication attribute parameter each have the label characteristic, and the processing circuitry is configured to:

detect whether the content characteristic of the first communication attribute parameter satisfies the preset content characteristic;

when the content characteristic of the first communication attribute parameter fails to satisfy the preset content characteristic, obtain contact information of the list of contact entries from the terminal device via the interface circuitry;

count the number of the specific contact entries of the list of contact entries in which the content characteristic of the first communication attribute parameter fails to satisfy the preset content characteristic; and when the number is greater than the preset threshold, determine that the contact information of the contact entry is abnormal.

6. The apparatus according to claim 1, wherein the processing circuitry is configured to:

determine, when the contact information of the contact entry is determined to be abnormal, whether the rule base includes an existing filtering rule for filtering contact entries according to the one or more abnormal parameter characteristics; and generate, when the rule base fails to include the existing filtering rule for filtering contact entries according to the one or more abnormal parameter characteristics, the new filtering rule for filtering contact entries according to the one or more abnormal parameter characteristics.

7. The apparatus according to claim 1, wherein the interface circuitry is configured to receive a rule deletion message sent by the terminal device, the rule deletion message indicating a specific filtering rule that has not been used by the terminal device for a preset duration; and the processing circuitry is configured to delete the specific filtering rule from the rule base according to the rule deletion message.

8. The apparatus according to claim 1, wherein the contact identifier is a contact name and the communication number is a telephone number.

9. A method, comprising:

receiving, by circuitry of an information processing apparatus, contact information provided by a terminal device for a contact entry in the terminal device, the contact information comprising a first communication attribute parameter of contact identifier and a second communication attribute parameter of communication number, the first communication attribute parameter and the second communication attribute parameter each having a content characteristic;

determining the contact information of the contact entry is abnormal with one or more abnormal parameter characteristics when a first condition and a second condition are satisfied;

generating, when the contact information of the contact entry is determined to be abnormal, a new filtering rule for filtering contact entries according to the one or more abnormal parameter characteristics;

adding the filtering rule to a rule base to obtain an updated rule base; and sending the updated rule base to the terminal device for the terminal device to filter contact entries in the terminal device according to the updated rule base, wherein the first condition is that the content characteristic of the first communication attribute parameter is empty or fails to satisfy a preset content characteristic, and the second condition is that a label characteristic of the second communication attribute parameter fails to satisfy a preset label characteristic or a count number of specific contact entries of a list of contact entries in which the content characteristic of the first communication attribute satisfies the first condition is greater than a preset threshold.

10. The method according to claim 9, wherein the first communication attribute parameter and the second communication attribute parameter each have the label characteristic, and the determining the contact information of the contact entry is abnormal with the one or more abnormal parameter characteristics further comprises:

detecting whether the content characteristic of the first communication attribute parameter is empty;

when the content characteristic of the first communication attribute parameter is detected to be empty, detecting whether the label characteristic of the second communication attribute parameter satisfies the preset label characteristic; and when the label characteristic of the second communication attribute parameter fails to satisfy the preset label characteristic, determining that the contact information of the contact entry is abnormal.

11. The method according to claim 9, wherein the determining the contact information of the contact entry is abnormal with the one or more abnormal parameter characteristics further comprises:

detecting whether the content characteristic of the first communication attribute parameter is empty;

when the content characteristic of the first communication attribute parameter is determined to be empty, obtaining contact information of the list of contact entries from the terminal device;

counting the number of the specific contact entries of the list of contact entries in which the content characteristic of the first communication attribute parameter is empty; and when the number is greater than the preset threshold, determining that the contact information of the contact entry is abnormal.

12. The method according to claim 9, wherein the first communication attribute parameter and the second communication attribute parameter each have the label characteristic, and the determining the contact information of the contact entry is abnormal with the one or more abnormal parameter characteristics further comprises:

detecting whether the content characteristic of the first communication attribute parameter satisfies the preset content characteristic;

when the content characteristic of the first communication attribute parameter fails to satisfy the preset content characteristic, detecting whether the label characteristic of the first communication attribute parameter satisfies the preset label characteristic; and when the label characteristic of the first communication attribute parameter fails to satisfy the preset label characteristic, determining that the contact information of the contact entry is abnormal.

13. The method according to claim 9, wherein the first communication attribute parameter and the second communication attribute parameter each have the label characteristic, and the determining the contact information of the contact entry is abnormal with the one or more abnormal parameter characteristics further comprises:

detecting whether the content characteristic of the first communication attribute parameter satisfies the preset content characteristic;

when the content characteristic of the first communication attribute parameter fails to satisfy the preset content characteristic, obtaining contact information of the list of contact entries from the terminal device;

counting the number of the specific contact entries of the list of contact entries in which the content characteristic of the first communication attribute parameter fails to satisfy the preset content characteristic; and when the number is greater than the preset threshold, determining that the contact information of the contact entry is abnormal.

14. The method according to claim 9, wherein the generating, when the contact information of the contact entry is determined to be abnormal, the new filtering rule for filtering the contact entries according to the one or more abnormal parameter characteristics further comprises:

determining, when the contact information of the contact entry is determined to be abnormal, whether the rule base includes an existing filtering rule for filtering the contact entries according to the one or more abnormal parameter characteristics; and generating, when the rule base fails to include the existing filtering rule for filtering contact entries according to the one or more abnormal parameter characteristics, the new filtering rule for filtering the contact entries according to the one or more abnormal parameter characteristics.

15. The method according to claim 9, further comprising:

receiving a rule deletion message sent by the terminal device, the rule deletion message indicating a specific filtering rule without being used by the terminal device within a preset duration; and deleting the specific filtering rule from the rule base according to the rule deletion message.

16. The method according to claim 9, wherein the contact identifier is a contact name and the communication number is a telephone number.

17. A non-transitory computer-readable medium storing instructions which when executed by a computer causes the computer to perform a method for data processing, the method comprising:

receiving contact information provided by a terminal device for a contact entry in the terminal device, the contact information comprising a first communication attribute parameter of contact identifier and a second communication attribute parameter of communication number, the first communication attribute parameter and the second communication attribute parameter each having a content characteristic;

determining the contact information of the contact entry is abnormal with one or more abnormal parameter characteristics when a first condition and a second condition are satisfied;

generating, when the contact information of the contact entry is determined to be abnormal, a new filtering rule for filtering contact entries according to the one or more abnormal parameter characteristics;

adding the filtering rule to a rule base to obtain an updated rule base; and sending the updated rule base to the terminal device for the terminal device to filter contact entries in the terminal device according to the updated rule base, wherein the first condition is that the content characteristic of the first communication attribute parameter is empty or fails to satisfy a preset content characteristic, and the second condition is that a label characteristic of the second communication attribute parameter fails to satisfy a preset label characteristic or a count number of specific contact entries of a list of contact entries in which the content characteristic of the first communication attribute satisfies the first condition is greater than a preset threshold.

18. The non-transitory computer-readable medium according to claim 17, wherein the first communication attribute parameter and the second communication attribute parameter each have the label characteristic, and the step of determining the contact information of the contact entry is abnormal with the one or more abnormal parameter characteristics further comprises:

detecting whether the content characteristic of the first communication attribute parameter is empty;

when the content characteristic of the first communication attribute parameter is detected to be empty, detecting whether the label characteristic of the second communication attribute parameter satisfies the preset label characteristic; and when the label characteristic of the second communication attribute parameter fails to satisfy the preset label characteristic, determining that the contact information of the contact entry is abnormal.

19. The non-transitory computer-readable medium according to claim 17, wherein the step of determining the contact information of the contact entry is abnormal with the one or more abnormal parameter characteristics further comprises:

detecting whether the content characteristic of the first communication attribute parameter is empty;

when the content characteristic of the first communication attribute parameter is determined to be empty, obtaining contact information of the list of contact entries from the terminal device;

counting the number of the specific contact entries of the list of contact entries in which the content characteristic of the first communication attribute parameter is empty; and when the number is greater than the preset threshold, determining that the contact information of the contact entry is abnormal.

20. The non-transitory computer-readable medium according to claim 17, wherein the first communication attribute parameter and the second communication attribute parameter each have the label characteristic, and the step of determining the contact information of the contact entry is abnormal with the one or more abnormal parameter characteristics further comprises:

detecting whether the content characteristic of the first communication attribute parameter satisfies the preset content characteristic;

when the content characteristic of the first communication attribute parameter fails to satisfy the preset content characteristic, detecting whether the label characteristic of the first communication attribute parameter satisfies the preset label characteristic; and when the label characteristic of the first communication attribute parameter fails to satisfy the preset label characteristic, determining that the contact information of the contact entry is abnormal.

* * * * *